United States Patent
Schlotterbeck et al.

(10) Patent No.: US 7,352,447 B2
(45) Date of Patent: Apr. 1, 2008

(54) ACTIVE OPTICAL MEASUREMENT DEVICE WITH WEAK SIGNAL AMPLIFICATION

(75) Inventors: Jean-Pierre Schlotterbeck, Rochefort-Samson (FR); Bertrand Baillon, Valence (FR); Xavier Lacondemine, Valence (FR)

(73) Assignee: Thales (FR)

( * ) Notice: Subject to any disclaimer, the term of this patent is extended or adjusted under 35 U.S.C. 154(b) by 24 days.

(21) Appl. No.: 11/429,964

(22) Filed: May 9, 2006

(65) Prior Publication Data
US 2007/0040730 A1  Feb. 22, 2007

(30) Foreign Application Priority Data
May 10, 2005  (FR) ................... 05 04685

(51) Int. Cl.
*G01P 3/36* (2006.01)
(52) U.S. Cl. .................... 356/28.5; 356/28
(58) Field of Classification Search ........... 356/28.5
See application file for complete search history.

(56) References Cited

U.S. PATENT DOCUMENTS

| | | | |
|---|---|---|---|
| 4,902,127 A | 2/1990 | Byer et al. | |
| 5,172,181 A | 12/1992 | Morbieu et al. | |
| 5,847,817 A | 12/1998 | Zediker et al. | |
| 6,100,965 A * | 8/2000 | Nerin ................ | 356/5.09 |
| 2002/0105632 A1 | 8/2002 | Holton | |
| 2003/0151732 A1 | 8/2003 | Rogers et al. | |
| 2004/0036852 A1 * | 2/2004 | Bruel et al. ........ | 356/28.5 |

FOREIGN PATENT DOCUMENTS

EP  1 055 941  11/2000

OTHER PUBLICATIONS

Abstract EP 1 055 941 Nov. 29, 2000 Mitsubishi Electric Corp.

* cited by examiner

*Primary Examiner*—Thomas H. Tarcza
*Assistant Examiner*—Luke Ratcliffe
(74) *Attorney, Agent, or Firm*—Lowe Hauptman Ham & Berner, LLP

(57) ABSTRACT

The invention relates to an optical measurement device designed notably to evaluate the velocity of an aircraft by detection of a Doppler shift. The device for measurement by optical probe comprises at least two light beams of different wavelengths $\lambda 1$, $\lambda 2$, denoted as first beam and second beam, the device illuminating a reference medium MILREF (60) by the first beam and receiving a light echo Sr reflected back by the reference medium, and the device comprising:
- an optical coupler COUPL (70) receiving, on the one hand, the light echo Sr reflected back by the reference medium MILREF and, on the other, the second beam, the coupler delivering a resultant wave Or comprising the second beam and the light echo Sr;
- an optical amplification unit AMPLI (80), of bandwidth $B_{opt}$, receiving the resultant wave Or and delivering an amplified resultant wave Ora.

15 Claims, 3 Drawing Sheets

ACTIVE OPTICAL MEASUREMENT DEVICE WITH WEAK SIGNAL AMPLIFICATION

FIELD OF THE INVENTION

The invention relates to an optical measurement device designed notably for evaluating the velocity of an aircraft by detection of a Doppler shift.

BACKGROUND OF THE INVENTION

Optical measurement devices or Lidars are used to determine the speed and the direction of the wind by the detection of the Doppler effect on a back-scatter signal of a light beam emitted by the measurement device into a medium that it is desired to analyze. The Doppler effect consists of a shift in the frequency of a light wave reflected back by a moving object. The distance between the measurement device and the object, for example a group of particles in motion, defines the type of detection of the Doppler shift which can, depending on the case, be of the coherent type or else of the direct or incoherent type.

These optical measurement devices are also used for measuring the velocity of aircraft relative to the surrounding medium; the optical measurement device is called a 'laser anemometer' when used in this application.

In the anemometer application, a detection of the coherent type is used; a beam coming from a source of light radiation, for example a laser, is separated into two beams. A first beam called signal beam is sent into the measurement region and a second beam called reference beam or local oscillator forms a reference for the detection of the Doppler shift.

Aerosols present in the atmosphere back-scatter the light from the signal beam whose frequency undergoes a Doppler shift with respect to that of the incident light. The signal back-scattered by the medium is mixed with the reference beam, and the result of this mixing is sent onto the photosensitive surface of a detector. The difference between the frequency of the back-scattered signal and that of the reference beam is measured in the electrical signal delivered by the detector and from this is deduced a measurement of the Doppler frequency shift then of the velocity of the aircraft with the knowledge that the expression linking these two quantities is the following:

$$Fd = 2v/\lambda$$

v being the projection onto the aiming axis of the laser of the velocity vector of the aircraft relative to the ambient medium (atmosphere);

$\lambda$ being the wavelength of the emitted beam.

FIG. 1 shows a flow block diagram of a Doppler frequency optical measurement device that constitutes the prior art for a heterodyne anemometer.

The device in FIG. 1 comprises a laser unit ULAS_A 10 supplying a light beam for illuminating a separation unit USEP_A 20 delivering a signal light beam Fs for illuminating an emission/reception optical signal channel EMIREC 50 and a reference light beam Fr for illuminating an optical coupler MEL 30.

The laser unit ULAS_A comprises a source of radiation and an optical device spatially shaping the radiation coming from the source, producing a light beam. The wavelength $\lambda 1$ of the light beam emitted by the laser unit ULAS_A is for example 1.55 µm which is a wavelength commonly employed in the field of optical Telecommunications and for which the atmosphere is relatively transparent.

The various components of the laser unit ULAS_A are not shown in FIG. 1.

The emission/reception optical signal channel EMIREC comprises an optical signal amplifier BOOS 53, a separation unit USEP_B 54 and an optical head TOP 55 in series, delivering a power optical signal Sinc focused into the reference medium MILREF 60. The emission/reception optical signal channel EMIREC may also comprise an optical signal frequency shifting device DEF 51, for example an acousto-optical modulator, shifting the frequency of the beam applied to it by around one hundred MegaHertz.

The position and orientation of the beam Sinc emerging from the optical head TOP can be controlled.

The separation unit USEP_B comprises, for example, a polarization separation coupler followed by a bidirectional optical link in series. The various components of the separation unit USEP_B are not shown in FIG. 1.

The optical head TOP captures light rays Sr (light echo) that are back-scattered by the reference medium MILREF in a given direction, these back-scattered light rays Sr possibly being subject to a Doppler frequency shift relative to the frequency of the beam Sinc incident on the medium MILREF.

The back-scattered light rays Sr are captured by the optical head TOP and take the form of a light beam called 'back-scattered signal beam' which is transported through the separation unit USEP_B in order to illuminate the optical mixing coupler MEL.

The optical mixing coupler MEL receives the reference light beam Fr coming from the coupler USEP_A at a first input and, at a second input, the back-scattered signal beam, or 'light echo', originating from the separation unit USEP_B. The optical mixing coupler MEL performs the mixing of the two optical signals applied to its two inputs, producing a beating effect on the photosensitive surface of a detector of a detection unit UDET 40.

The detection unit UDET comprises a photosensitive detector delivering an electrical signal when a light beam of wavelength $\lambda 1$ is applied to its sensitive surface, this electrical signal varying at the same frequency as the periodic motion of the beating effect, and a signal processing unit which is supplied with the electrical signal coming from the detector and which performs the detection and the extraction of the Doppler frequency shift. The measurement of the velocity v of the aircraft motion together with the determination of the direction of its motion can be deduced from the measurement of the Doppler frequency shift.

The components of the detection unit UDET are not shown in FIG. 1.

One of the main criteria of merit for the anemometer shown in FIG. 1 is the signal-to-noise ratio (SNR) measured at the output of the detector of the detection unit UDET. The higher the SNR value, the more readily the anemometric measurement is performed, and the study of the value taken by this parameter allows, for example, the choice of the components with which the optical measurement device is equipped to be optimized.

The value of the signal-to-noise ratio SNR is maximized when the photon noise, which constitutes the ultimate limit below which it is impossible to go, dominates the other sources of noise (laser intensity noise, detector dark noise, detector thermal noise). This maximization can be attained by increasing the power of the useful signal.

A domination of the photon noise over the other noise terms can be attained by reducing the dark noise power of the detector, and/or by increasing the power of the signal of the reference optical channel, or 'local oscillator', $P_{OL}$ arriving at the detector. An increase in the power of the local oscillator $P_{OL}$ has the drawback of causing additional costs for the detection unit, and this increase is furthermore still limited by the detector saturation level.

Since the power $P_{OL}$ is limited, the invention is based on the idea of an increase in the power of the useful signal by an increase in the power of the back-scattered signal $P_{SR}$ arriving at the detector.

SUMMARY OF THE INVENTION

For this purpose, the subject of the present invention is a device for measurement by optical probe comprising at least two light beams of different wavelengths $\lambda 1$, $\lambda 2$, denoted as first beam and second beam, the device illuminating a reference medium MILREF by the first beam and receiving a light echo Sr reflected back by the reference medium MILREF, the device being noteworthy in that it comprises:
- an optical coupler COUPL receiving, on the one hand, the light echo Sr reflected back by the reference medium MILREF and, on the other, the second beam, the optical coupler COUPL delivering a resultant wave Or comprising the second beam and the light echo Sr;
- an optical amplification unit AMPLI, of bandwidth $B_{opt}$, receiving the resultant wave Or and delivering an amplified resultant wave Ora.

Advantageously, the frequency of the second beam, corresponding to $\lambda 2$, and the frequency of the light echo Sr are included in the bandwidth $B_{opt}$ of the optical amplification unit AMPLI.

Advantageously, the radiation source or sources used to generate the device beams are either continuous or pulsed.

Advantageously, the radiation source or sources used to generate the device beams are micro-lasers fabricated as integrated optics on glass.

Advantageously, the constituent components of the device are hybrid components on a planar waveguide.

With respect to the prior art, this solution comprises a single additional cost represented by the amplification device for the optical signal; this additional cost remains low when components used in large volumes within the Telecommunications industry are employed.

BRIEF DESCRIPTION OF THE DRAWINGS

The invention will be better understood from the description of the various embodiments of the device for measurement by optical probe according to the invention, with reference to the appended drawings in which.

In order to facilitate the reading of the description, the same reference numbers will denote the same elements in the various figures.

DETAILED DESCRIPTION OF THE EMBODIMENTS

Figure 2:
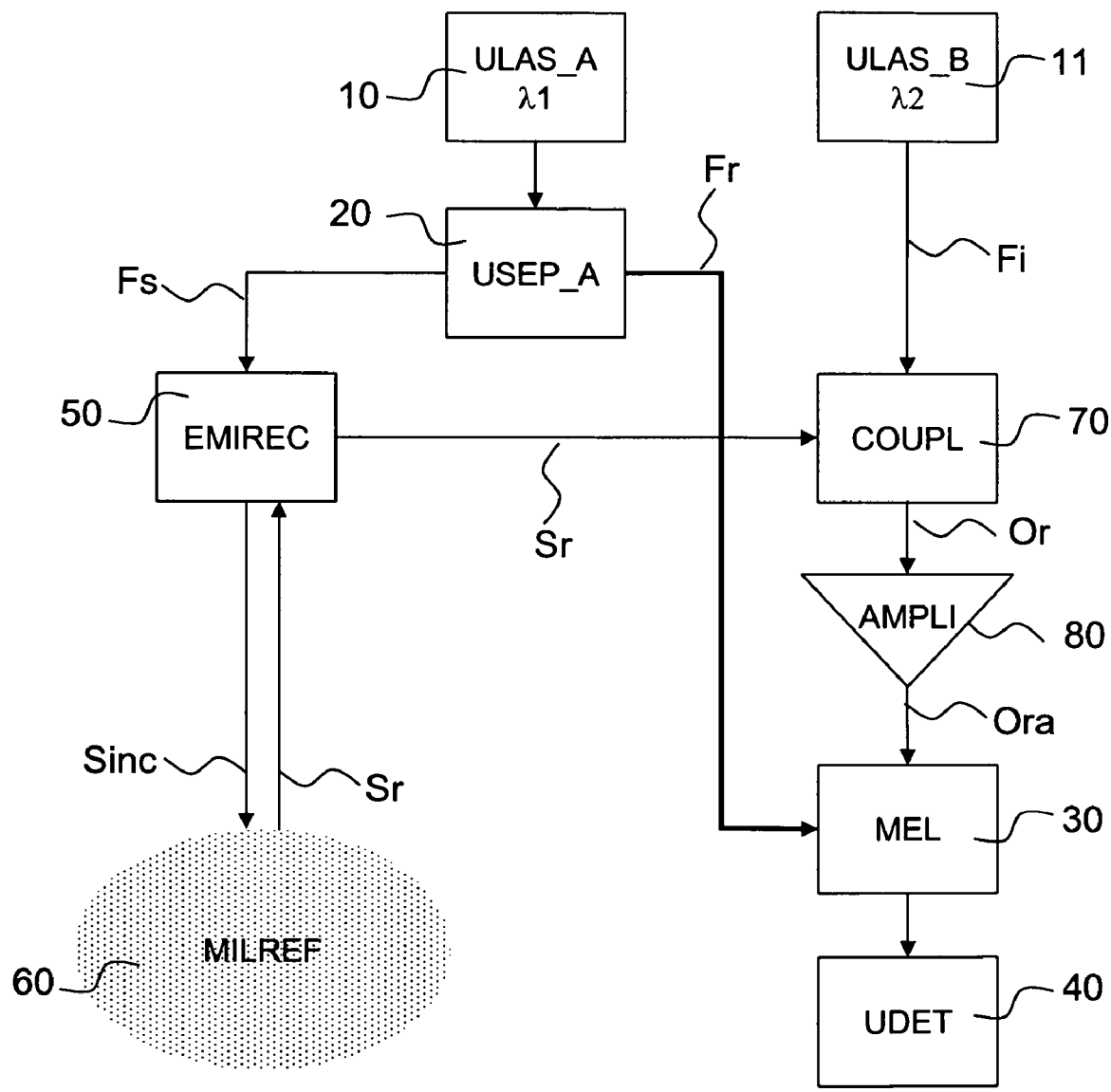
FIG. 2, shows a flow block diagram of an embodiment of the device according to the invention.

FIG. 2, shows a flow block diagram of an embodiment of the device, according to the invention, for example for a laser anemometer.

The device in FIG. 2 comprises two laser units ULAS_A 10, ULAS_B 11.

Figure 1:
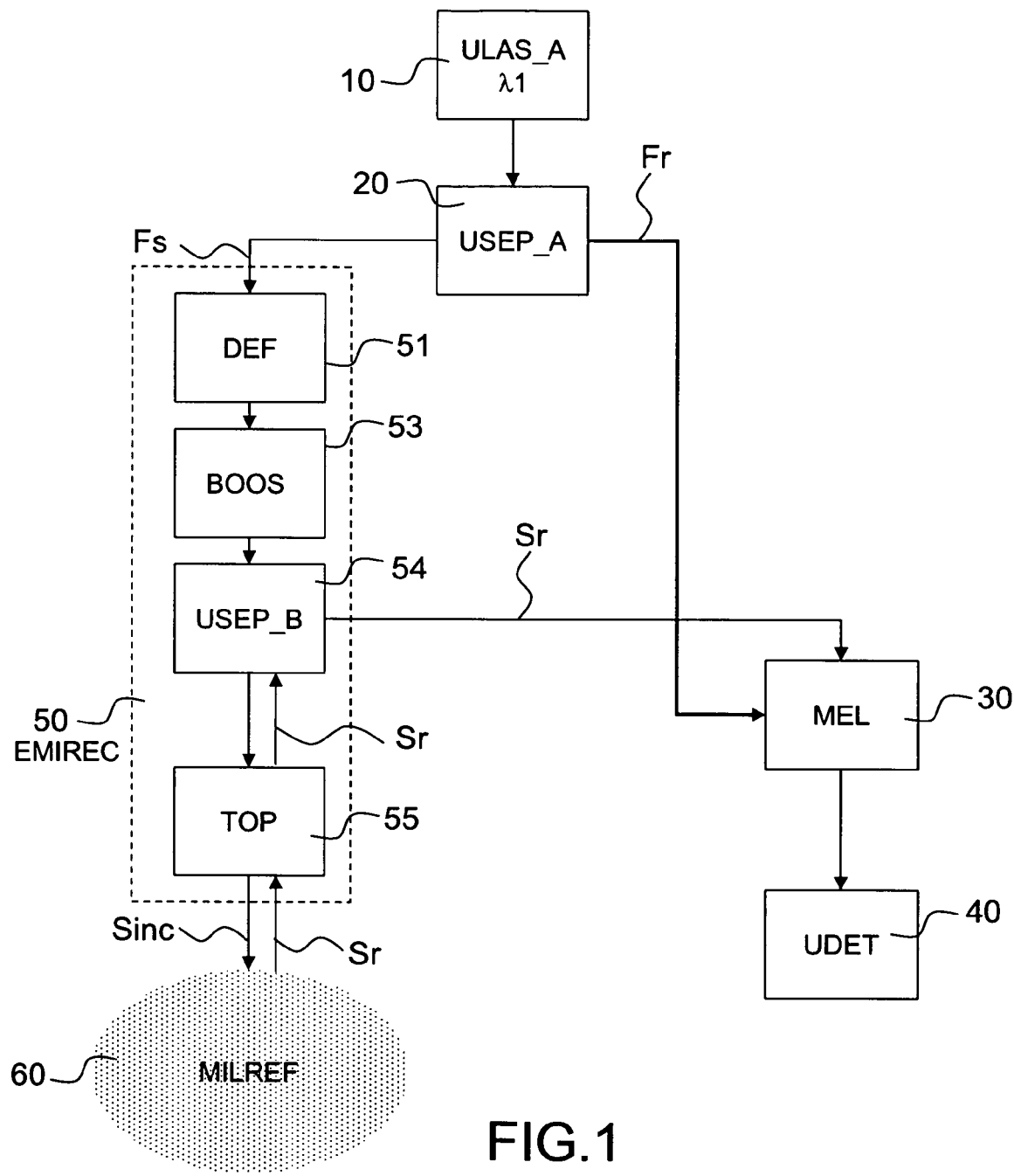
FIG. 1, already described, shows a flow block diagram of an optical measurement device with a detection of the coherent type from the prior art.

The laser unit ULAS_A, identical to that in FIG. 1, supplies the first beam for illuminating a separation unit USEP_A 20 delivering a signal light beam Fs for illuminating an emission/reception optical signal channel EMIREC 50, and a reference light beam Fr for illuminating the optical mixing coupler MEL 30.

The laser unit ULAS_B, identical to the laser unit ULAS_A in FIG. 1, generates the second light beam, illuminating a first input of an optical coupler COUPL 70, the optical coupler COUPL receiving, at a second input, the light echo Sr originating from an emission/reception optical signal channel EMIREC, the optical coupler COUPL delivering the resultant wave Or at its output. The emission/reception optical signal channel EMIREC, identical to that in FIG. 1, supplies, from the signal light beam Fs, a power optical signal Sinc focused into the reference medium MILREF, receives the light echo Sr and transports it to the optical coupler COUPL, where the reference light beam Fr and the power optical signal Sinc can be shifted in frequency;

The device additionally comprises:
- an optical amplification unit AMPLI 80 receiving the resultant wave Or coming from the output of the optical coupler COUPL, and generating an amplified resultant wave Ora.

The gain of the optical amplification unit AMPLI is greater than 3 dB. The optical amplification unit AMPLI is used over two frequency sub-bands. The first is the useful band for the laser anemometer, in other words a few hundreds of MegaHertz around the frequency emitted toward the reference medium MILREF, and corresponding to the range of Doppler frequencies sought. The second sub-band is removed from the first by a few tens of GigaHertz, but remains within the bandwidth of the optical amplification unit AMPLI;
- the optical mixing coupler MEL receiving, at a first input, the reference light beam Fr coming from the separation unit USEP_A and, at a second input, the amplified resultant wave Ora. The optical mixing coupler MEL delivers a beat-frequency optical signal comprising the sum of the reference light beam Fr and of the amplified resultant wave Ora;
- a detection unit UDET 40 comprising a photosensitive detector receiving on its sensitive surface the beat-frequency optical signal from the optical mixing coupler MEL and delivering a beat-frequency electrical signal. The frequency of the beat-frequency electrical signal is equal to the difference of the frequency of the reference light beam Fr and of that of the amplified resultant wave Ora.

The wavelength $\lambda 2$ of the second beam is slightly different from the wavelength $\lambda 1$ of the first beam. Here, 'slightly different' is with reference to the field of optics, the difference between $\lambda 1$ and $\lambda 2$ being for example of one tenth of a nanometer for a wavelength $\lambda 1$ of 1.55 µm, which, expressed as a frequency difference between the first beam and the second beam, is equivalent to around ten GigaHertz.

Figure 3:
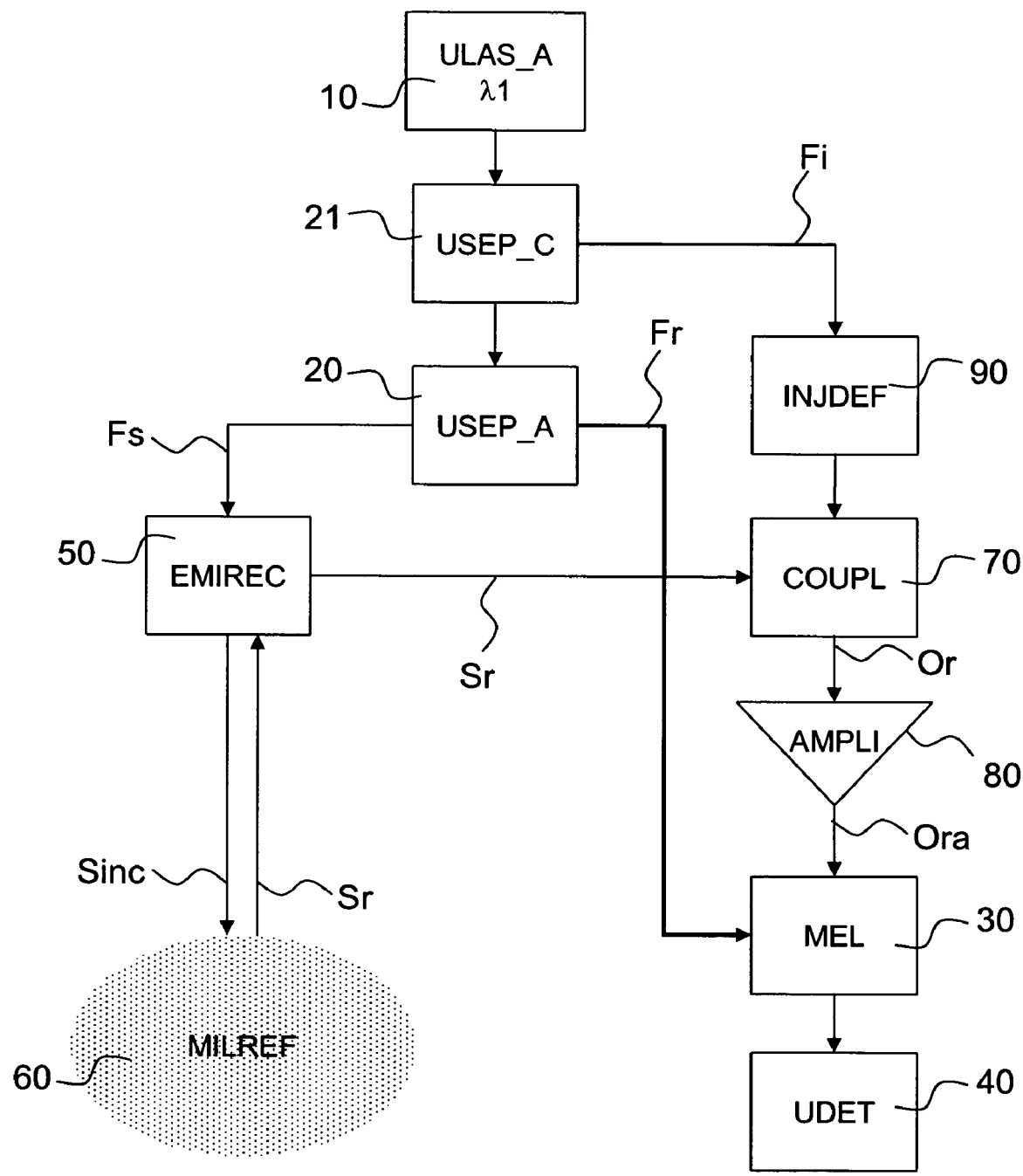
FIG. 3, shows a flow block diagram of a variant of the embodiment in FIG. 2.

FIG. 3 shows a variant of the embodiment of the device in FIG. 2.

In this embodiment, the device comprises a single laser unit ULAS_A 10, identical to that in FIG. 1, itself comprising a single radiation source, the first and the second beam being generated from this single radiation source.

The laser unit ULAS_A supplies a first beam for illuminating a separation unit USEP_C 21 delivering a secondary beam for illuminating a separation unit USEP_A 20 and an injection beam Fi for illuminating an optical signal frequency shifting device INJDEF 90.

The separation unit USEP_A delivers a signal light beam Fs for illuminating an emission/reception optical signal channel EMIREC 50, and a reference light beam Fr for illuminating an optical mixing coupler MEL 30. The emission/reception optical signal channel EMIREC, identical to that in FIG. 1, supplies, from the signal light beam Fs, a power optical signal Sinc focused into the reference medium MILREF, receives the light echo Sr and transports it to a first input of an optical coupler COUPL 70, where the reference light beam Fr and the power optical signal Sinc can be shifted in frequency. The optical signal frequency shifting device INJDEF receiving the injection beam Fi supplies a second beam for illuminating a second input of the optical coupler COUPL that delivers a resultant wave Or at its output. The second beam has a wavelength λ2 slightly different from that of the injection beam Fi.

The optical signal frequency shifting device INJDEF shifts the frequency of the beam that it produces at the output, with respect to the frequency of that applied to it. The frequency shift produced by INJDEF is greater than the width of the range of the Doppler frequencies sought. For example, if the range of Doppler frequencies sought equals 600 MegaHertz, the frequency shift is greater than two GigaHertz.

The device additionally comprises:
an optical amplification unit AMPLI 80 receiving the resultant wave Or coming from the output of the optical coupler COUPL, and generating an amplified resultant wave Ora;
the optical mixing coupler MEL receiving, at a first input, the reference light beam Fr coming from the separation unit USEP_A and, at a second input, the amplified resultant wave Ora, and delivering a beat-frequency optical signal comprising the sum of the reference light beam Fr and of the amplified resultant wave Ora;
a detection unit UDET 40 comprising a photosensitive detector receiving on its sensitive surface the beat-frequency optical signal coming from the optical mixing coupler MEL and delivering a beat-frequency electrical signal, the frequency of the beat-frequency electrical signal being equal to the difference of the frequency of the reference light beam Fr and of that of the amplified resultant wave Ora.

The means of generating the second beam constitutes the only difference between the device shown in FIG. 2 and its variant shown in FIG. 3.

In another variant, the device comprises two separate optical signal channels; this is referred to as a 'bi-static' configuration. The two separate optical signal channels may be described as follows:
an emission optical signal channel supplying a power optical signal Sinc focused into the reference medium MILREF 60;
a reception optical signal channel receiving the light echo Sr and transporting it to the optical mixing coupler MEL 30;

The emission optical signal channel comprises an optical signal amplifier BOOS 53 and an optical head TOP 55 delivering a power optical signal Sinc focused into the reference medium MILREF. The emission optical signal channel may also comprise, in series, an optical signal frequency shifting device, for example an acousto-optical modulator or an electro-optical modulator, shifting the frequency of the beam applied to it by around one hundred MegaHertz.

The reception optical signal channel comprises another optical head that captures the light rays Sr back-scattered by the reference medium MILREF. At the output of the reception optical channel, the light rays Sr take the form of a light beam referred to as 'back-scattered signal beam' or light echo Sr which is transported to the optical coupler COUPL 70.

The number of optical signal channels used to probe the reference medium MILREF and capture the light echo Sr constitutes the only difference between the device shown in FIG. 2 and this other variant of the device.

The invention claimed is:

1. A device for measurement by optical probe comprising at least two light beams of different wavelengths denoted as first beam and second beam, the device illuminating a reference medium by the first beam and receiving a light echo reflected back by the reference medium, and the device comprising:

an optical coupler receiving, on the one hand, the light echo reflected back by the reference medium and, on the other, the second beam, the optical coupler delivering a resultant wave comprising the second beam and the light echo;

an optical amplification unit, of bandwidth, receiving the resultant wave and delivering an amplified resultant wave;

a laser unit supplying the first beam for illuminating a separation unit delivering a signal light beam for illuminating an emission/reception optical signal channel, and a reference light beam for illuminating a first input of an optical mixing coupler;

a laser unit generating the second light beam illuminating a first optical coupler input the optical coupler receiving, at a second input, the light echo originating from the emission/reception optical signal channel, the optical coupler delivering the resultant wave at its output, the emission/reception optical signal channel, from the signal light beam, supplying a power optical signal focused into the reference medium, receiving the light echo and transporting it to the optical coupler, where the reference light beam Fr and the power optical signal can be shifted in frequency;

the optical amplification unit receiving the resultant wave coming from the output of the optical coupler, and generating an amplified resultant wave, the optical mixing coupler receiving, at a first input, the reference light beam coming from the separation unit and, at a second input, the amplified resultant wave, and delivering a beat-frequency optical signal comprising the sum of the reference light beam and of the amplified resultant wave; and a detection unit comprising a photosensitive detector receiving on its sensitive surface the beat-frequency optical signal from the optical mixing coupler and delivering a beat-frequency electrical signal, the frequency of the beat-frequency electrical signal being equal to the difference of the frequency of the reference light beam and of that of the amplified resultant wave.

2. A device for measurement by optical probe comprising at least two light beams of different wavelengths denoted as first beam and second beam, the device illuminating a reference medium by the first beam and receiving a light echo reflected back by the reference medium, and the device comprising:

an optical coupler receiving, on the one hand, the light echo reflected back by the reference medium and, on the other, the second beam, the optical coupler delivering a resultant wave comprising the second beam and the light echo;

an optical amplification unit, of bandwidth, receiving the resultant wave and delivering an amplified resultant wave, wherein the frequency of the second beam and the frequency of the light echo are included in the bandwidth of the optical amplification unit;

a laser unit supplying the first beam for illuminating a separation unit delivering a signal light beam for illuminating an emission/reception optical signal channel, and a reference light beam for illuminating a first input of an optical mixing coupler;

a laser unit generating the second light beam illuminating a first optical coupler input the optical coupler receiving, at a second input, the light echo originating from the emission/reception optical signal channel, the optical coupler delivering the resultant wave at its output, the emission/reception optical signal channel, from the signal light beam, supplying a power optical signal focused into the reference medium, receiving the light echo and transporting it to the optical coupler, where the reference light beam and the power optical signal can be shifted in frequency;

the optical amplification unit receiving the resultant wave coming from the output of the optical coupler, and generating an amplified resultant wave, the optical mixing coupler receiving, at a first input, the reference light beam coming from the separation unit and, at a second input, the amplified resultant wave, and delivering a beat-frequency optical signal comprising the sum of the reference light beam Fr and of the amplified resultant wave;

a detection unit comprising a photosensitive detector receiving on its sensitive surface the beat-frequency optical signal from the optical mixing coupler and delivering a beat-frequency electrical signal, the frequency of the beat-frequency electrical signal being equal to the difference of the frequency of the reference light beam Fr and of that of the amplified resultant wave.

3. A device for measurement by optical probe comprising at least two light beams of different wavelengths denoted as first beam and second beam, the device illuminating a reference medium by the first beam and receiving a light echo reflected back by the reference medium, the device comprising:

an optical coupler receiving the light echo reflected back by the reference medium and the second beam, the optical coupler delivering a resultant wave comprising the second beam and the light echo;

an optical amplification unit, of bandwidth, receiving the resultant wave and delivering an amplified resultant wave;

a laser unit supplying the first beam for illuminating a separation unit delivering a secondary beam for illuminating a separation unit and an injection beam for illuminating an optical signal frequency shifting device INJDEF, the separation unit delivering a signal light beam for illuminating an emission/reception optical signal channel, and a reference light beam for illuminating an optical mixing coupler, the emission/reception optical signal channel, from the signal light beam, supplying a power optical signal focused into the reference medium, receiving the light echo and transporting it to a first input of the optical coupler, the reference light beam and the power optical signal being shifted in frequency, the optical signal frequency shifting device receiving the injection beam and supplying the second beam for illuminating a second input of the optical coupler, the second beam having a wavelength slightly different from that of the injection beam, the optical coupler delivering a resultant wave at its output;

the optical amplification unit receiving the resultant wave coming from the output of the optical coupler, and generating an amplified resultant wave;

the optical mixing coupler receiving, at a first input, the reference light beam coming from the separation unit and, at a second input, the amplified resultant wave, and delivering a beat-frequency optical signal comprising the sum of the reference light beam Fr and of the amplified resultant wave; and a detection unit comprising a photosensitive detector receiving on its sensitive surface the beat-frequency optical signal from the optical mixing coupler and delivering a beat-frequency electrical signal, the frequency of the beat-frequency electrical signal being equal to the difference of the frequency of the reference light beam and of that of the amplified resultant wave.

4. The device as claimed in claim 1, comprising:

a laser unit supplying the first beam for illuminating a separation unit delivering a secondary beam for illuminating a separation unit and an injection beam for illuminating an optical signal frequency shifting device, the separation unit delivering a signal light beam Fs for illuminating an emission/reception optical signal channel, and a reference light beam for illuminating an optical mixing coupler, the emission/reception optical signal channel, from the signal light beam, supplying a power optical signal focused into the reference medium, receiving the light echo and transporting it to a first input of the optical coupler, the reference light beam and the power optical signal being shifted in frequency, the optical signal frequency shifting device receiving the injection beam and supplying the second beam for illuminating a second input of the optical coupler, the second beam having a wavelength slightly different from that of the injection beam, the optical coupler delivering a resultant wave at its output;

the optical amplification unit receiving the resultant wave coming from the output of the optical coupler, and generating an amplified resultant wave;

the optical mixing coupler receiving, at a first input, the reference light beam coming from the separation unit and, at a second input, the amplified resultant wave, and delivering a beat-frequency optical signal comprising the sum of the reference light beam Fr and of the amplified resultant wave;

a detection unit comprising a photosensitive detector receiving on its sensitive surface the beat-frequency optical signal from the optical mixing coupler and delivering a beat-frequency electrical signal, the frequency of the beat-frequency electrical signal being equal to the difference of the frequency of the reference light beam and of that of the amplified resultant wave.

5. The device as claimed in claim 3, wherein the radiation source or sources of the laser units are pulsed.

6. The device as claimed in claim 3, wherein the radiation source or sources of the laser units are continuous.

7. The device as claimed in claim 3, wherein the radiation source or sources of the laser units are micro-lasers fabricated as integrated optics on glass.

8. The device as claimed in claim 2, wherein the radiation source or sources of the laser units are micro-lasers fabricated as integrated optics on glass.

9. The device as claimed in claim 1, wherein the radiation source or sources of the laser units are micro-lasers fabricated as integrated optics on glass.

10. The device as claimed in claim 3, wherein the optical coupler, optical amplification unit, and the laser units are hybrid components on a planar waveguide.

11. The device as claimed in claim 2, wherein the optical coupler, optical amplification unit, and the laser units are hybrid components on a planar waveguide.

12. The device as claimed in claim 1, wherein the optical coupler, optical amplification unit, and the laser units are hybrid components on a planar waveguide.

13. The device as claimed in claim 3, wherein the gain of the optical amplification unit AMPLI is greater than 3 dB.

14. The device as claimed in claim 2, wherein the gain of the optical amplification unit AMPLI is greater than 3 dB.

15. The device as claimed in claim 1, wherein the gain of the optical amplification unit AMPLI is greater than 3 dB.

* * * * *